United States Patent
Okubi

(10) Patent No.: US 11,532,231 B2
(45) Date of Patent: Dec. 20, 2022

(54) INFORMATION COLLECTION SYSTEM, RELAY DEVICE, COLLECTION DEVICE, AND RECORDING MEDIUM STORING PROGRAM

(71) Applicant: TOYOTA JIDOSHA KABUSHIKI KAISHA, Toyota (JP)

(72) Inventor: Ryota Okubi, Funabashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/076,948

(22) Filed: Oct. 22, 2020

(65) Prior Publication Data
US 2021/0150902 A1 May 20, 2021

(30) Foreign Application Priority Data
Nov. 19, 2019 (JP) .............................. JP2019-208884

(51) Int. Cl.
*G08G 1/16* (2006.01)
*H04N 7/18* (2006.01)
(Continued)

(52) U.S. Cl.
CPC ......... *G08G 1/164* (2013.01); *B60W 30/0956* (2013.01); *G06V 20/58* (2022.01);
(Continued)

(58) Field of Classification Search
CPC .......... G08G 1/164; G08G 1/167; G08G 1/22; G08G 1/0112; G08G 1/0133;
(Continued)

(56) References Cited

U.S. PATENT DOCUMENTS

2016/0217333 A1 7/2016 Ozawa
2017/0278321 A1 9/2017 Nishida et al.
(Continued)

FOREIGN PATENT DOCUMENTS

CN 109712431 A 5/2019
JP 2017-174244 A 9/2017
(Continued)

*Primary Examiner* — Nasim N Nirjhar
(74) *Attorney, Agent, or Firm* — Sughrue Mion, PLLC

(57) ABSTRACT

An information collection system includes a control device installed at a vehicle, a collection device that collects obstacle information from a plurality of the control devices, and a relay device that relays communications between the control device and the collection device. A first processor of the control device calculates a degree of confidence that an obstacle as included in a captured image captured by an image capture device provided at the vehicle, and transmits image information related to the captured image, position information added to the captured image, and the degree of confidence, to the relay device. A second processor of the relay device receives the image information, the position information, and the degree of confidence, from the control devices, and identifies an obstacle included in a captured image according to the image information in descending order of the degree of confidence. If an obstacle has been identified, the second processor transmits text information relating to the position of the identified obstacle and the content of the identified obstacle to the collection device. A third processor of the collection device receives the text information from one or more of the relay devices and stores the text information corresponding to the identified obstacle.

6 Claims, 12 Drawing Sheets

(51) Int. Cl.
  *G08G 1/00* (2006.01)
  *B60W 30/095* (2012.01)
  *G06V 20/58* (2022.01)
  *H04W 4/44* (2018.01)
  *H04L 67/289* (2022.01)

(52) U.S. Cl.
  CPC .............. *G08G 1/167* (2013.01); *G08G 1/22* (2013.01); *H04N 7/183* (2013.01); *B60W 2420/42* (2013.01); *H04L 67/289* (2013.01); *H04W 4/44* (2018.02)

(58) Field of Classification Search
  CPC ........... G08G 1/0141; G08G 1/096716; G08G 1/096741; G08G 1/096775; G08G 1/165; B60W 30/0956; B60W 2420/42; B60W 2556/20; G06K 9/00805; H04N 7/183; H04N 7/181; H04L 67/289; H04L 67/2828; H04W 4/44
  See application file for complete search history.

(56) References Cited

U.S. PATENT DOCUMENTS

| | | | |
|---|---|---|---|
| 2019/0007484 A1* | 1/2019 | Chen | H04W 4/40 |
| 2019/0130757 A1 | 5/2019 | Hori et al. | |
| 2019/0219524 A1* | 7/2019 | Jimenez, Jr. | G01V 5/00 |
| 2020/0026720 A1* | 1/2020 | Liu | G05D 1/101 |
| 2020/0333789 A1* | 10/2020 | Suzuki | G01S 17/89 |

FOREIGN PATENT DOCUMENTS

| | | |
|---|---|---|
| JP | 2019022205 A | 2/2019 |
| JP | 2019040539 A | 3/2019 |
| JP | 2019148987 A | 9/2019 |

* cited by examiner

INFORMATION COLLECTION SYSTEM, RELAY DEVICE, COLLECTION DEVICE, AND RECORDING MEDIUM STORING PROGRAM

CROSS-REFERENCE TO RELATED APPLICATION

This application is based on and claims priority under 35 USC 119 from Japanese Patent Application No. 2019-208884 filed on Nov. 19, 2019, the disclosure of which is incorporated by reference herein.

BACKGROUND

Technical Field

The present disclosure relates to an information collecting system for collecting information from a vehicle, a relay device, a collecting device, and a recording medium storing a program.

Related Art

Japanese Patent Application Laid-open No. 2017-174244 discloses an information processing device intended to provide appropriate information to a vehicle that is a connected car, which is controlled based on recognition results obtained by external world recognition means.

Here, when image processing is performed on a captured image captured by a vehicle in the information processing apparatus disclosed in Japanese Patent Laid-Open No. 2017-174244 in order to identify a road obstacle, when image processing is performed in the information processing apparatus on all captured images transmitted from the vehicle side, the load at the side of the information processing apparatus is increased.

SUMMARY

The present disclosure aims to provide an information collection system, a relay device, a collection device, and a recording medium storing a program, which can reduce the amount of information received by a device at the collection side when collecting information about an obstacle based on an image captured in a vehicle, and that can reduce the processing load.

A first aspect is an information collection system including a control device installed at a vehicle, a collection device that collects obstacle information from a plurality of the control devices, and a relay device that relays communications between the control device and the collection device. The control device includes a calculation unit and a first transmission unit. The calculation unit calculates a degree of confidence as to whether or not an obstacle is included in a captured image captured by an image capture device provided at the vehicle. The first transmission unit transmits image information regarding the captured image, position information added to the captured image, and the degree of confidence, to the relay device. The relay device includes a first receiver unit, a processing unit, and a second transmission unit. The first receiver unit receives the image information, the position information, and the degree of confidence front the plurality of the control devices. The processing unit performs image processing for identifying an obstacle included in a captured image related to the image information in decreasing order of the degree of confidence.

In a case in which an obstacle has been identified, the second transmission unit transmits text information relating to the position of the identified obstacle and the content of the identified obstacle to the collection device. The collection device includes a second receiver unit and a storage unit. The second receiver unit receives the text information from one or more of the relay devices. The storage unit stores the text information corresponding to the identified obstacle.

The information collection system according to the first aspect is configured such that obstacle information is collected by a collection device based on information transmitted from a control device installed at a vehicle. In the control device, the calculation unit calculates a degree of confidence that a captured image captured by an image capture device includes an obstacle, and the first transmission unit relays the image information related to the captured image, the position information, and the degree of confidence to the relay device. In the relay device, the first receiver unit receives the information transmitted from the first transmission unit, and the processing unit performs image processing in decreasing order of the dune of confidence and attempts to identify an obstacle included in the captured image.

Then, when an obstacle is identified, the second transmission unit in the relay device transmits the position information of the identified obstacle and text information related to the identified obstacle to the collection device. In the collection device, the second receiver unit receives the information transmitted from the second transmission unit, and the storage unit stores the received text information.

As described above, in the information collection system, the image information is transmitted from the control device to the relay device, and the text information is transmuted from the relay device to the collection device. That is, according to this information collection system, the image information is converted into text information having a smaller information amount than the image information by passage through the relay device. Therefore, the amount of information received by the collection device can be reduced, and the processing load can be reduced.

The information collection system of a second aspect is the information collection system of the first aspect, which includes a determination unit and a notification unit. The second receiver unit receives other position information of another vehicle, and the determination unit determines whether or not the other vehicle having the other position information has approached the identified obstacle corresponding to the position information. The notification unit notifies the other vehicle of danger information based on the text information in a case in which the determination unit determines that the other vehicle has approached the identified obstacle.

In the information collection system of the second aspect, the second receiver unit receives the text information relating to the position of the identified obstacle and the other position information of the other vehicle, and the determination unit determines whether or not the other vehicle has approached the identified obstacle. In a case in which it is determined that the other vehicle has approached the identified obstacle, the notification unit notifies the other vehicle of danger information. This danger information can include, for example, text information relating to the position and content of the obstacle. According to this information collection system, it is possible to alert another vehicle to an obstacle on the road based on the position information of the identified obstacle.

A third aspect is a relay device that includes a receiver unit, a processing unit, and a transmission unit. The receiver unit receives image information of a captured image captured by an capture device provided at a vehicle, position information attached to the captured image, and a degree of confidence that an obstacle is included in the captured image, from a control device installed at each of plural of the vehicles. The processing unit performs image processing for identifying art obstacle included in a captured image related to the image information in decreasing order of the degree of confidence. In a case in which an obstacle has been identified, the transmission unit transmits text information relating to a position of the identified obstacle and to a content of the identified obstacle to a collection device configured to collect obstacle information.

The relay device according to the third aspect is a device that performs relay between a control device installed at each of a plurality of vehicles and a collection device that collects obstacle information. In the relay device, the receiver unit receives the image information of the captured image and the degree of confidence transmitted from the control device, and the processing unit performs image processing in decreasing order of the degree of confidence and attempts to identify an obstacle included in the captured image. Then, when an obstacle is identified, the transmission unit transmits the position information of the identified obstacle and text information related to the content of the identified obstacle to the collection device. According to this relay device, image information is converted into text information having a smaller amount of information than the image information in the process of transmitting information from the control device to the collection device. Therefore, the amount of information received by the collection device can be reduced, and the processing load can be reduced.

A fourth aspect is a non-transitory recording medium, which stores a program that is executable by a computer to function as respective units of the relay device according to the third aspect.

According to the non-transitory recording medium of the fourth aspect, it is possible to reduce the amount of information received by the collection device and to reduce the processing load.

A fifth aspect is a collection device, which includes a receiver unit, a storage unit, a determination unit, and a notification unit. The receiver unit receives, from a relay device that identifies an obstacle included in an image captured at a vehicle, text information relating to a position of an identified obstacle and to a content of the identified obstacle, and receives other position information of another vehicle. The storage unit stores the text information corresponding to the identified obstacle. The determination unit determines whether or not the other vehicle having the other position information has approached the identified obstacle corresponding to the position information. The notification unit notifies the other vehicle of danger information based on the text information in a case in which the determination unit determines that the other vehicle has approached the identified obstacle.

The collection device of the fifth aspect is a device that collects obstacle information from a relay device. The relay device identifies an obstacle based on a captured image received from a vehicle. In the collection device, the receiver unit receives text information relating to the position of the identified obstacle and the content of the identified obstacle transmitted from the relay device, and the determination unit determines whether or not the other vehicle has approached the identified obstacle. In a case in which it is determined that the other vehicle has approached the identified obstacle, the notification unit notifies the other vehicle of danger information. This danger information can include, for example, text information relating to the position and content of the obstacle. According to this collection device, it is possible to alert another vehicle to an obstacle on the road based on the position information of the identified obstacle. Further, since the collection device processes the obstacle information not from the image information but from the text information having a smaller information amount than the image information, the processing load at the collection device can be reduced.

A sixth aspect is a non-transitory recording medium, which stores a program that is executable by a computer to function as respective units of the collection device according to the fifth aspect.

According to the non-transitory recording medium of the sixth aspect, it is possible to call another vehicle's attention to an obstacle on the road based on the position information of the identified obstacle. Further, since the obstacle information is processed not from the image information but from the text information having a smaller information amount than the image information, the processing load can be reduced.

According to the present disclosure, when collecting information related to an obstacle based on an image captured at a vehicle, the amount of information received by a device on the collection side can be reduced and the processing load can be reduced.

BRIEF DESCRIPTION OF THE DRAWINGS

An exemplary embodiment of the present disclosure will be described in detail based on the following figures, wherein.

DETAILED DESCRIPTION

Figure 1:
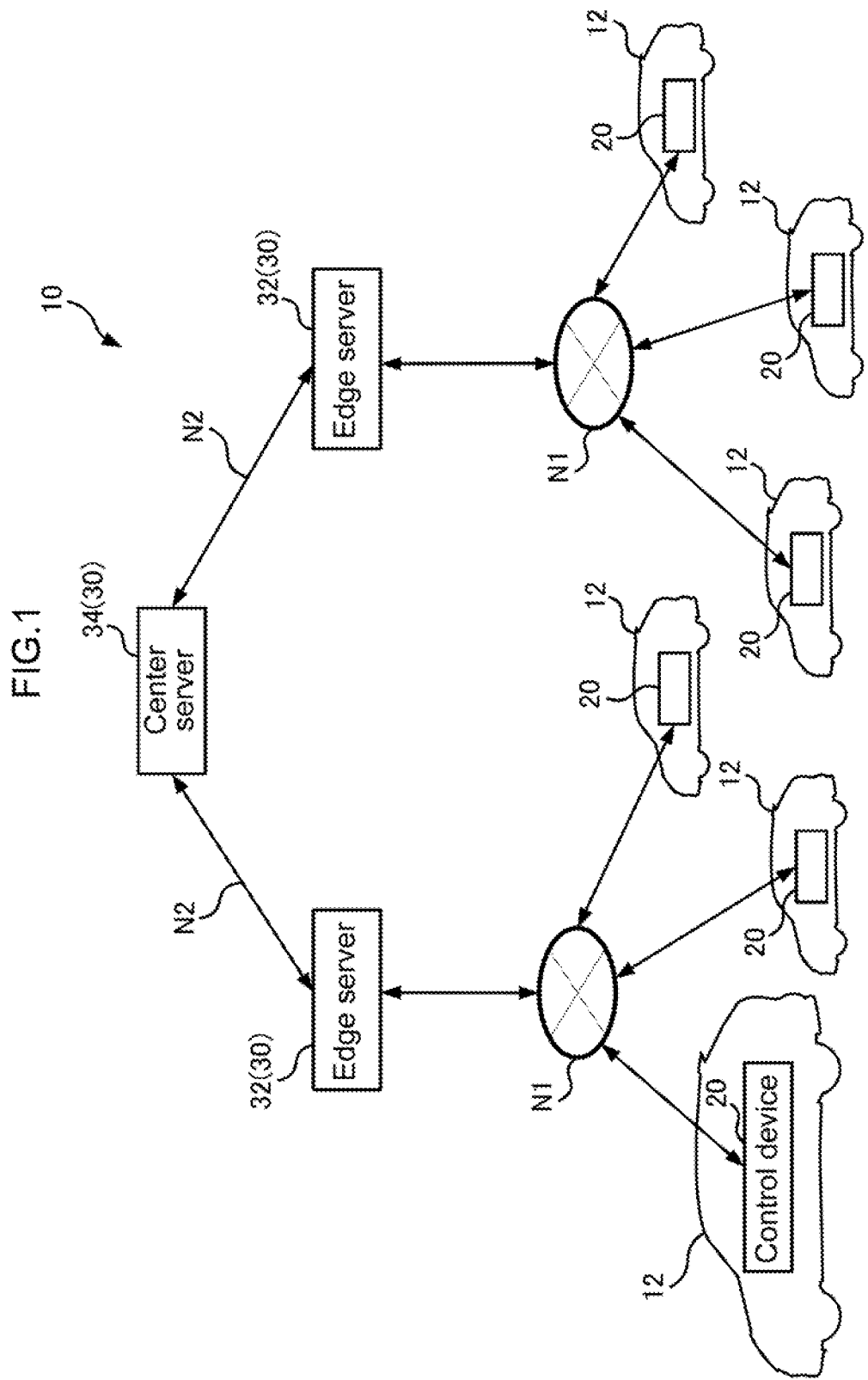
FIG. 1 is a diagram showing a schematic configuration of an information collecting system according to an embodiment.

As shown in FIG. 1, the information collection system 10 of the present embodiment is configured to include a plurality of vehicles 12 and a plurality of servers 30. A control device 20 is mounted on each vehicle 12. The server 30 includes an edge server 32 as a relay device and a center server 34 as a collection device. The edge server 32 has a function of relaying communication between the control device 20 and the center server 34.

Figure 2:
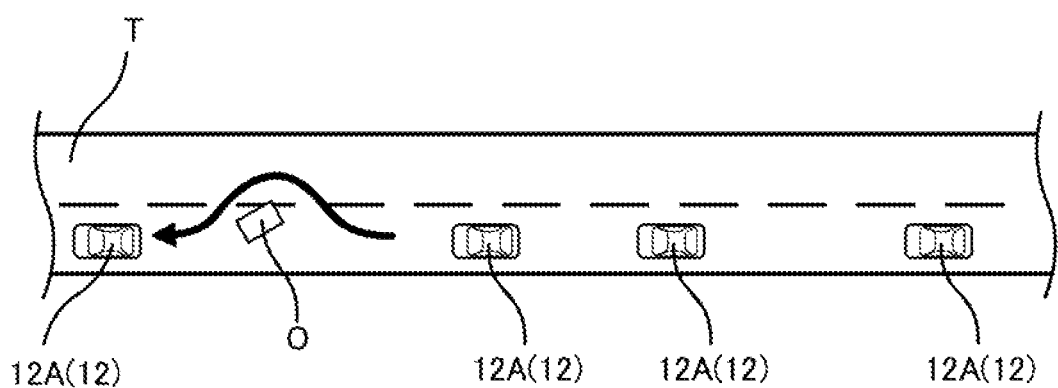
FIG. 2 is a diagram illustrating a passing vehicle that passes an obstacle.
Figure 12:
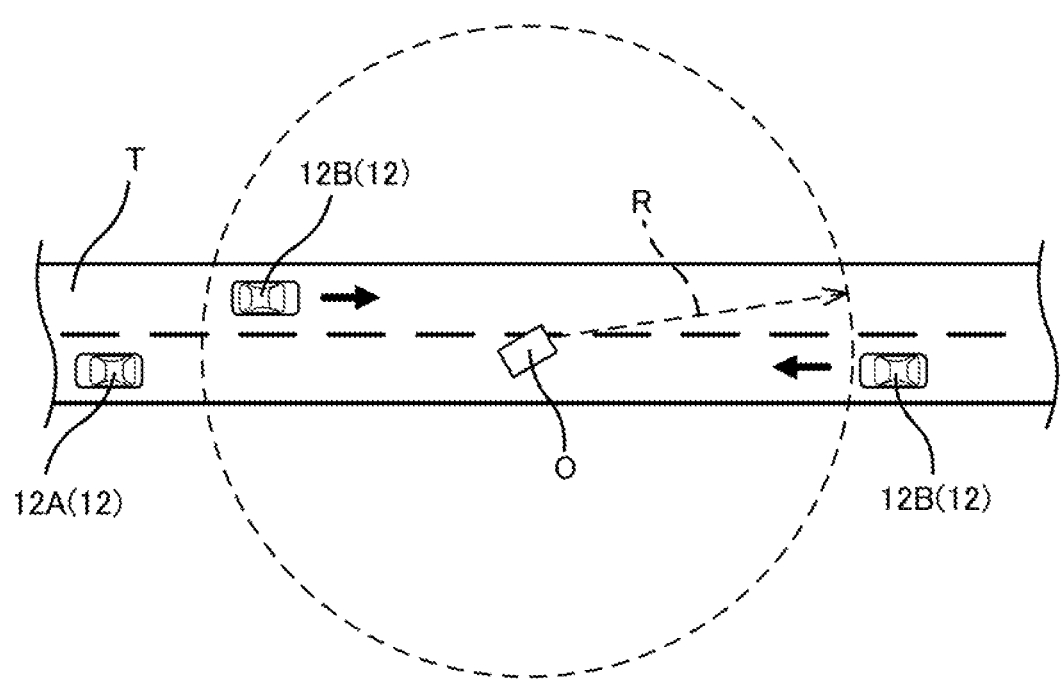
FIG. 12 is a diagram illustrating a state in which notification processing is executed.

As shown in FIG. 2, the plurality of vehicles 12 includes a passing vehicle 12A that travels on the traveling path T and a peripheral vehicle 12B that travels m the periphery of the passing vehicle 12A and is referred to in FIG. 12. Here, the passing vehicle 12A is a vehicle 12 that passes the obstacle O before the nature of the obstacle O is identified, and the peripheral vehicle 12B is a vehicle 12 that approaches the obstacle O after the obstacle O is identified.

In the present embodiment, the passing vehicle 12A corresponds to the "vehicle" of the present disclosure, and the peripheral vehicle 12B corresponds to the "other vehicle" of the present disclosure. The peripheral vehicle 12B is not limited to a following vehicle that travels in the same lane as the passing vehicle 12A on the traveling road T, but also includes an oncoming vehicle that travels in the oncoming lane and a vehicle that travels on another traveling road connected to the traveling road T. The obstacle O corresponds to the "specified obstacle" of the present disclosure.

The control device 20 of each vehicle 12 and the edge server 32 are connected to each other via a network N1. The edge server 32 and the center server 34 are connected to each other via a network N2.

In the information collection system 10 of FIG. 1, two edge servers 32 are connected to one center server 34, and three vehicles 12 are connected to each edge server 32. However, it is not limited to this. That is, one or more edge servers 32 can be connected to one center server 34, and one or more vehicles 12 (specifically, control devices 20) can be connected to each edge server 32.

(Vehicle)

Figure 3:
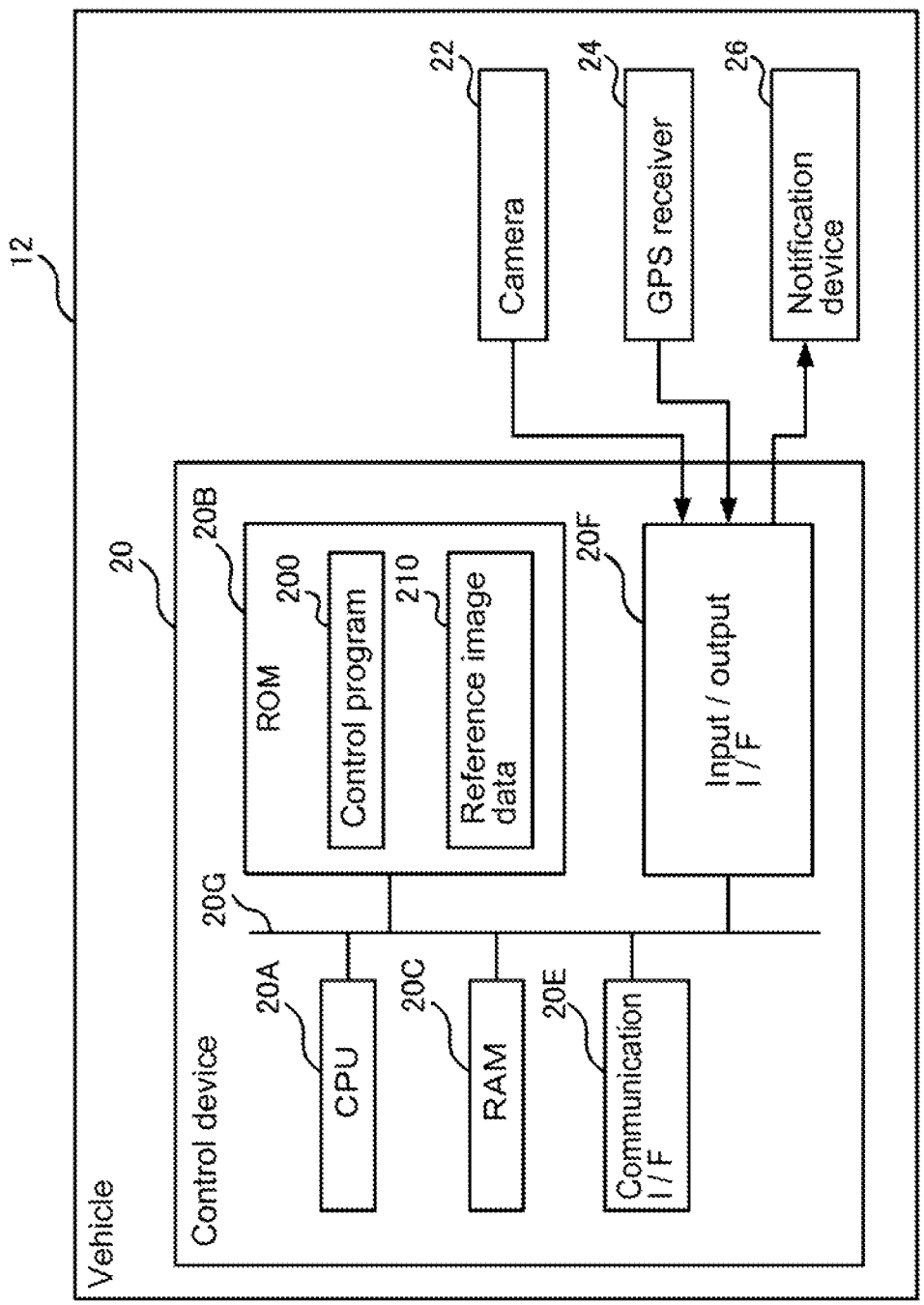
FIG. 3 is a block diagram illustrating a hardware configuration of a vehicle according to the embodiment.

As shown in FIG. 3, the vehicle 12 according to the present embodiment includes a control device 20, a camera 22 as an imaging device, a GPS receiver 24, and a notification device 26. GPS stands for Global Positioning System.

The control device 20 is configured to include a CPU 20A, a ROM 20B, a RAM 20C, a communication I/F 20E, and an input/output I/F 20F. The CPU 20A, the ROM 20B, the RAM 20C, the communication 20E, and the input/output I/F 20F are connected so as to be capable of communicating with each other through a bus 20G. CPU means Central Processing Unit, ROM means Read Only Memory, RAM means Random Access Memory, and I/F means interface.

The CPU 20A is a central computation processing unit that executes various programs and controls the respective units. Namely, the CPU 20A reads a program from the ROM 20B, and executes the program employing the RAM 20C as a workspace. The CPU 20A is an example of a first processor.

The ROM 20B stores various programs and various data. A control program 200 and reference image data 210 are stored in the ROM 20B of this embodiment. The control program 200 is a program for performing the estimation processing described below. The reference image data 210 stores plural items of image information related to known obstacles. The reference image data 210 may be stored in an SD card, a USB memory, or the like, connected to the control device 20. SD stands for Secure Digital and USB stands for Universal Serial Bus.

The RAM 20C serves as a workspace for temporary storage of programs and data.

The communication I/F 20E is an interface for connecting to the network N1 to communicate with the edge server 32. For communication with the edge server 32, a communication standard such as 5G, LTE, or Wi-Fi (registered trademark) is used, for example.

The input/output I/F 20F is an interface for communicating with the camera 22, the GPS receiver 24, and the notification device 26 mounted on the vehicle 12.

The camera 22 is fixed to the upper part of the front window of the vehicle 12, for example, and captures images to the front of the vehicle 12. Note that the camera 22 may not only capture images to the front of the vehicle 12 but may also capture images to the rear of the vehicle 12 and of the interior of the vehicle cabin.

The GPS receiver 24 receives GPS signals from plural GPS satellites, and measures the current position of the vehicle 12.

The notification device 26 is a device that is provided in the cabin of the vehicle 12 and that notifies the driver of information regarding the obstacle O. The notification device 36 may be a meter unit, a car navigation system, or an independent device.

Figure 4:
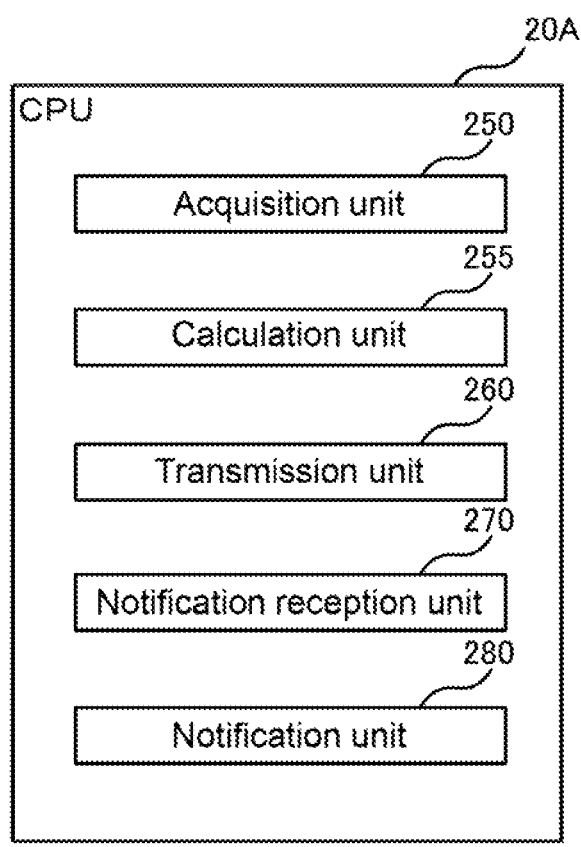
FIG. 4 is a block diagram illustrating an example of a functional configuration of a CPU in a control device of the embodiment.

FIG. 4 is a block diagram illustrating an example of the functional configuration of the control device 20. Each functional configuration is realized by the CPU 20A reading and executing the control program 200 stored in the ROM 20B. The CPU 20A of the present embodiment functions as the acquisition unit 250, the calculation unit 255, the transmission unit 260, the notification reception unit 270, and the notification unit 280, by executing the control program 200.

The acquisition unit 250 has a function of acquiring image information regarding a captured image captured by the camera 22, position information of the vehicle 12 detected by the GPS receiver 24, the current time, and the like. When the camera 22 images the obstacle O on the traveling path T, the acquisition unit 250 acquires image information triggered by an imaging instruction from the driver, position information, and information such as the current time. The imaging instruction corresponds, for example, to operation of a switch for imaging. In this embodiment, the position information of the passing vehicle 12A corresponds to the "position information" of the present disclosure, and the position information of the surrounding vehicle 12B corresponds to the "other position information" of the present disclosure. The captured image acquired in the present embodiment may be a moving image or a still image.

The calculation unit 255 has a function of calculating a degree of confidence that the captured image captured by the camera 22 provided at the vehicle 12 includes the obstacle O. The degree of confidence is represented by a degree of similarity to the estimated obstacle. The calculation unit 255 calculates the degree of similarity of the captured image captured by the camera 22, for each known obstacle stored in the reference image data 210. Here, a known method is used to calculate the degree of similarity. For example, the feature points of the captured image and the feature points of the known obstacle can be respectively extracted, and the degree of similarity can be calculated from the degree of matching between the respective feature points. Then, the calculation unit 255 sets the obstacle of the captured image having the highest degree of similarity as the estimated obstacle, and sets the highest degree of similarity as the degree of confidence regarding the estimated obstacle.

The transmission unit 260, as a first transmission unit, has a function of transmitting the image information acquired by the acquisition unit 250 to the edge server 32. Here, attachment information corresponding to the image information and the degree of confidence is added to the image information transmitted by the transmission unit 260. The additional information includes the position information of the vehicle 12 when the captured image was captured, the information of the traveling road T, the traveling direction, and the traveling time. When the confidence level exceeds a predetermined threshold value, the transmission unit 260 transmits the image information about the estimated obstacle, the attached information attached to the captured image, and the confidence level, to the edge server 32.

The notification receiving unit 270 has a function of receiving danger information (described below) transmitted from the center server 34. The "danger information" includes text information, to be described later, regarding the position of the obstacle O and the content of the obstacle O. The danger information is notified from the center server 34 via server 32 when the vehicle 12 is the surrounding vehicle 12B and approaches the obstacle O specified based on the captured image captured by the passing vehicle 12A.

The notification unit 280 has a function of notifying the driver that the obstacle O is approaching, based on the danger information received from the center server 34. The notification unit 280 operates the notification device 26 at the timing when the danger information is received.

(Server)

Figure 5:
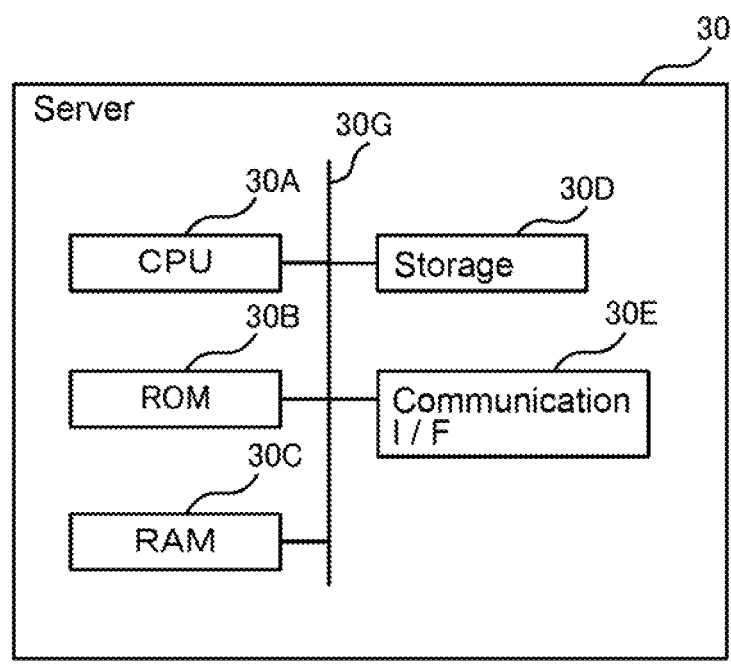
FIG. 5 is a block diagram illustrating a hardware configuration of a server of the embodiment.

As illustrated in FIG. 5, the server 30 is configured including a CPU 30A, ROM 30B, RAM 30C, storage 30D, and a communication I/F 30E. The CPU 30A, ROM 30B, RAM 30C, storage 30D, and communication I/F 30E are connected so as to be capable of eating with each other through a bus 30G. The functions of the CPU 30A, ROM 30B, and RAM 30C are the same as those of the CPU 20A, ROM 20B, and RAM 20C of the control device 20 described above.

The storage 30D is configured by a Hard Disk Drive or a Solid State Drive and stores various programs and various data.

The communication I/F 30E is an interface for communicating with the control device 20 and another server 30. The communication I/F 30E of the edge server 32 is an interface connectable to both the network N1 and the network N2. The network N2 may be a dedicated line or a line based on a communication standard such as 5G or LTE. The communication I/F 30E of the center server 34 is an interface connectable to at least the network N2.

The CPU 30A reads a program from the storage 30D and executes the program using the RAM 30C as a work area. In the CPU 30A of the present embodiment, different functions are realized in the edge server 32 and in the center server 34.

(Edge Server)

Figure 6A:
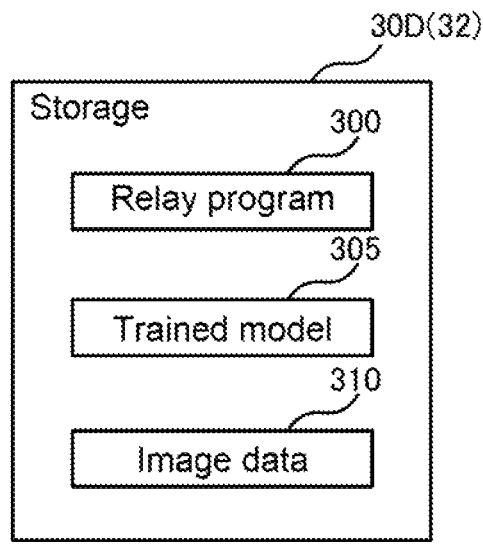
FIG. 6A is a block diagram showing an example of data stored in a storage, which is an edge server of the embodiment.
Figure 6B:
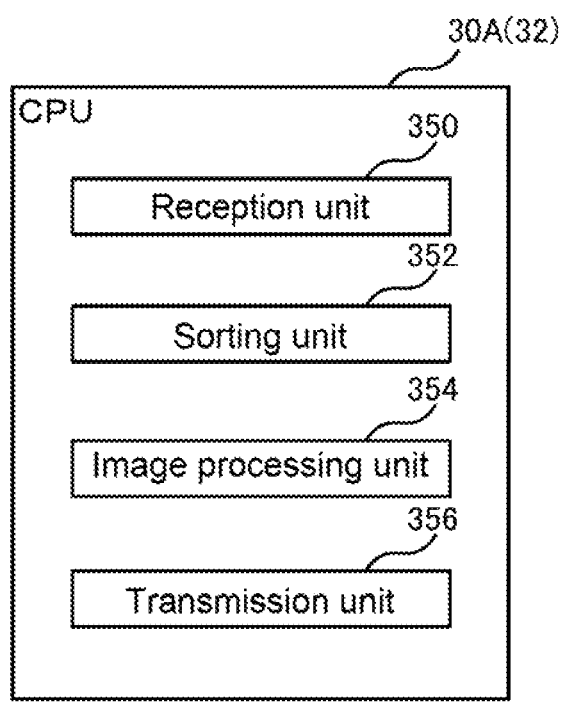
FIG. 6B is a block diagram showing art example of a functional configuration of a CPU, which is the edge server of the embodiment.

As shown in FIG. 6A, the edge server 32 of this embodiment stores a relay program 300, a trained model 305, and image data 310, in a storage 30D. The relay program 300 is a program for performing the computerization processing described below. By executing the relay program 300, the CPU 30A of the edge server 32 functions as a reception unit 350, a rearrangement unit 352, an image processing unit 354, and a transmission unit 356 illustrated in FIG. 6B. The CPU 30A of the edge server 32 is an example of a second processor.

The reception unit 350, as a first receiver unit, has a function of receiving the image information to which the attached information and the confidence level is added, which is transmitted from to plural control devices 20.

The rearrangement unit 352 has a function of rearranging the captured images related to the image information received by the reception unit 350 at different timings. The rearrangement unit 352 sorts the captured images according to the capturing location, in other words, the position of the passing vehicle 12A when the image is captured, and the traveling direction of the vehicle 12, and rearranges the images in descending order of confidence.

The image processing unit 354, as a processing unit, has a function of performing image processing for identifying obstacles in the captured images in descending order of confidence. The image processing is executed by inputting image information to the learned model 305 that has performed machine-learning using previously known obstacles as teacher data. When it is possible to identify what the obstacle is as a result of the image processing, information on the shape and size of the identified obstacle O, and position information and the like, are generated.

The transmission unit 356, as a second transmission unit, has a function of transmitting text information relating to the position of the obstacle O and the content of the obstacle O to the center server 34.

(Center Server)

Figure 7A:
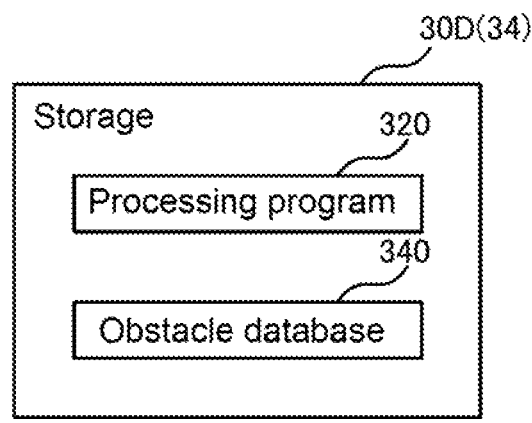
FIG. 7A is a block diagram showing an example of data stored in a storage, which is a center server of the embodiment.
Figure 7B:
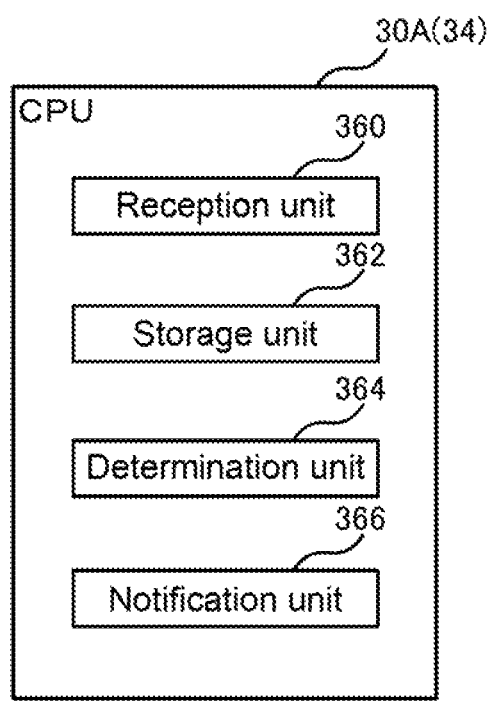
FIG. 7B is a block diagram showing an example of a functional configuration of a CPU, which is the center server of the embodiment.

As shown in FIG. 7A, the center server 34 of this embodiment stores a processing program 320 and an obstacle database 340 in the storage 30D. The processing program 320 is a program for performing the collection processing and notification processing described below. By executing the processing, program 320, the CPU 30A of the center server 34 functions as the reception unit 360, the storage unit 362, the determination unit 364, and the notification unit 366 shown in FIG. 7B. The CPU 30A of the center server 34 is an example of a third processor.

The reception unit 360, as a second receiver unit, has a function of receiving text information transmitted from one or more edge servers 32.

The storage unit 362 has a function of storing information on the obstacle O based on the text information in the storage 30D. The storage unit 362 stores, in the storage 30D, as information related to the obstacle O identified based on the text information, information such as, for example, "a cardboard box has fallen on National Highway No. XX, inbound, in the vicinity of XX".

The determination unit 364 has a function of determining whether the surrounding vehicle 12B has approached the obstacle O. The determination unit 364 determines from the position information given to the obstacle O that the vehicle 12B has approached the obstacle O when the surrounding vehicle 12B is present at a predetermined distance. The predetermined distance is within the range of the distance R referred to in FIG. 12, for example.

The notification unit 366 has a function of notifying the surrounding vehicle 12B of the danger information. When the determination unit 364 determines that the obstacle O has been approached, the notification unit 366 of the present embodiment notifies the surrounding vehicle 12B of the danger information. That is, the center server 34 transmits the danger information to the control device 20 of the peripheral vehicle 12B via the edge server 32.

(Control Flow)

An example of the flow of processing executed in the information collection system 10 of this embodiment will be described with reference to the flowcharts of FIGS. 8 to 11.

First, when the obstacle O has fallen on the traveling path T, the flow of the estimation processing executed in the control device 20 of the passing vehicle 12A that has passed by avoiding the obstacle O is as follows.

Figure 8:
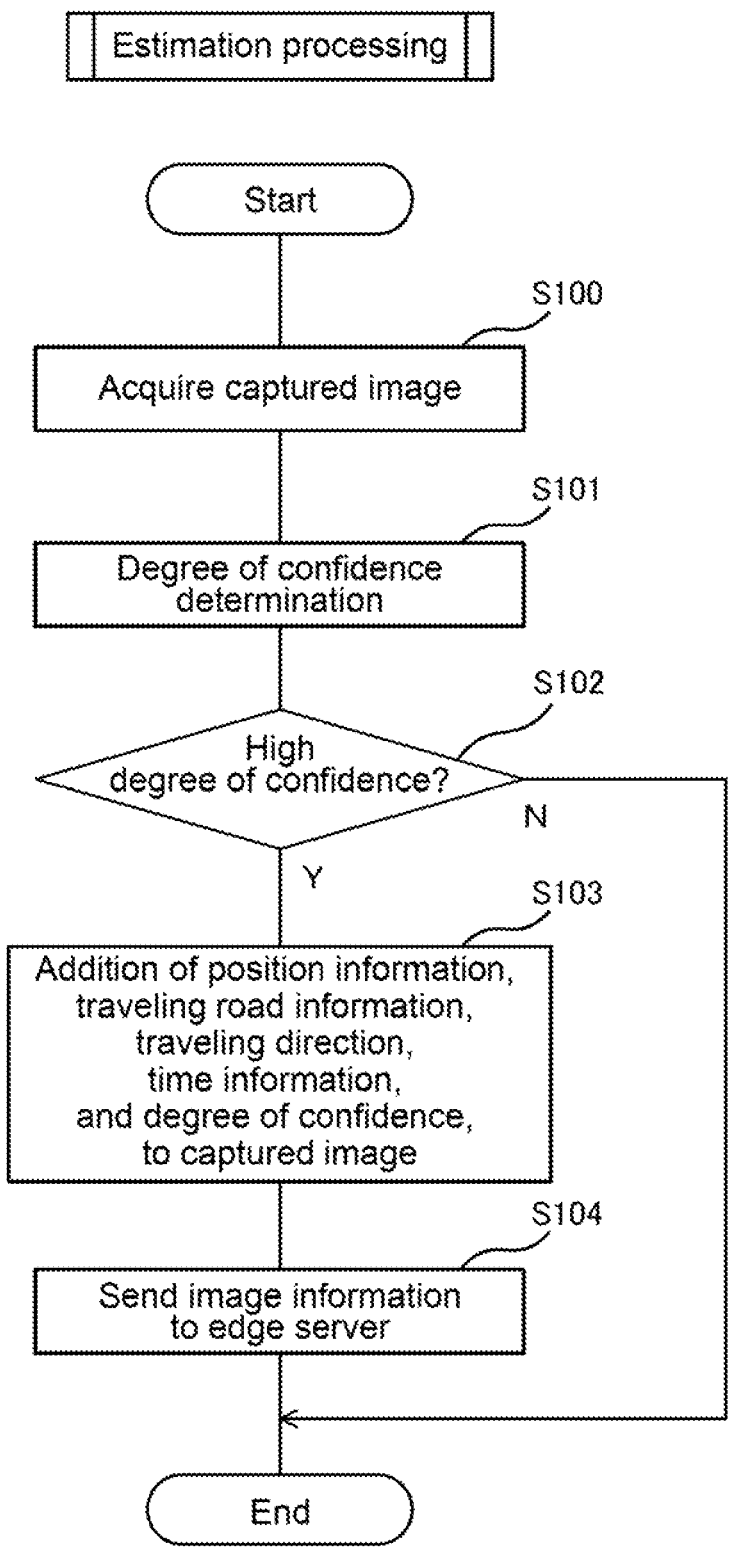
FIG. 8 is a flowchart showing the flow of estimation processing executed in the control device of the embodiment.

In step S100 of FIG. 8, the CPU 20A acquires a captured image from the camera 22.

In step S101, the CPU 20A determines the degree of confidence. Specifically, the CPU 20A calculates the degree of similarity of the captured image captured by the camera 22, for each known obstacle stored in the reference image data 210. Then, the CPU 20A sets the obstacle of the captured image having the highest degree of similarity as the estimated obstacle, and sets the highest degree of similarity as the degree of confidence regarding the estimated obstacle. Note that it is not always necessary to specify what the estimated obstacle is at this point.

In step S102, the CPU 20A determines whether or not the degree of confidence is high. Specifically, it is determined whether or not the calculated degree of confidence is above a preset threshold value. When the CPU 20A determines that the confidence level is high, that is, when the confidence level exceeds the threshold value, the process proceeds to step S103. On the other hand, when the CPU 20A determines that the degree of confidence is not high, that is, when the degree of confidence is less than or equal to the threshold value, the estimation processing ends.

In step S103, the CPU 20A adds to the captured image, as additional information, the position information of the vehicle 12, specifically, of the passing vehicle 12A, the information on the traveling road T, the traveling direction, and the traveling time. Further, the CPU 20A adds the confidence level to the captured image.

In step S104, the CPU 20A transmits the image information, with the additional information and the confidence level attached, to the edge server 32. The estimation processing is then ended.

Next, the flow of the information processing executed in the edge server 32 is as follows.

Figure 9:
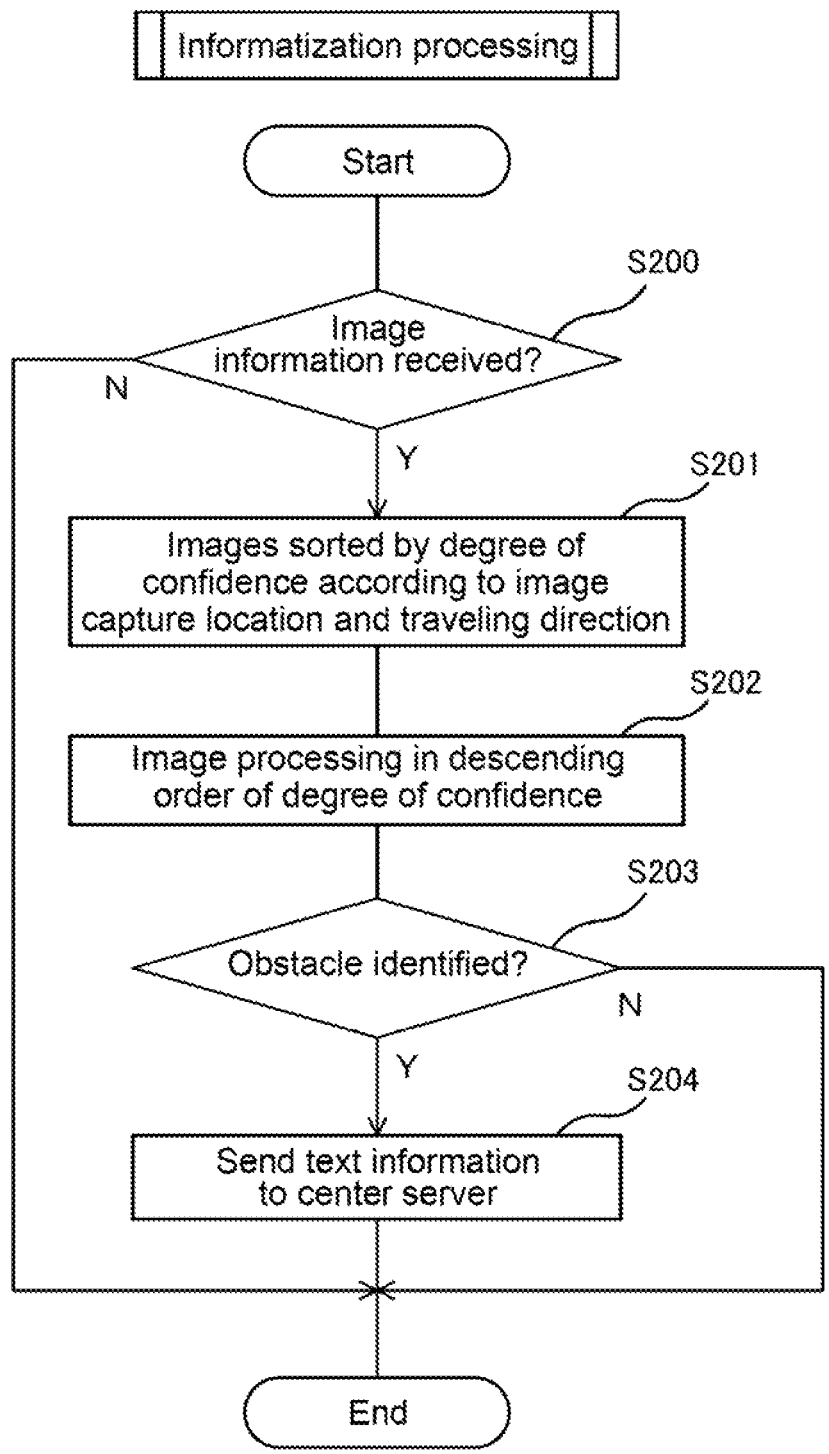
FIG. 9 is a flowchart showing the flow of computerization processing executed in the edge server of the embodiment.

In step S200 of FIG. 9, the CPU 30A determines whether or not image information has been received from the control device 20. When the CPU 30A determines that the image information has been received, the processing proceeds to step S201. On the other hand, when the CPU 30A determines that the image information has not been received, the CPU 30A ends the information processing.

In step S201, the CPU 30A rearranges the received captured images in descending order of confidence level for each capture location and traveling direction oldie vehicle.

In step S202, the CPU 30A executes image processing in descending order of confidence level. That is, the CPU 30A inputs the image information to the learned model 330 and tries to identify the obstacle O.

In step S203, the CPU 30A determines whether or not the obstacle O has been identified. When the CPU 30A determines that the obstacle O has been specified, the processing proceeds to step S204. On the other hand, when the CPU 30A determines that the obstacle O has not been specified, the CPU 30A ends the information processing.

In step S204, the CPU 30A transmits text information relating to the position of the obstacle O and the content of the obstacle O to the center server 34. Then, the information processing ends.

In the information processing executed by the edge server 32, the reception of a new captured image of the obstacle O from the control device 20 may be terminated at the time when the obstacle O can be identified, and the received new captured image of the obstacle O may be deleted.

Next, the flow of the collection processing executed in the center server 34 is as follows.

Figure 10:
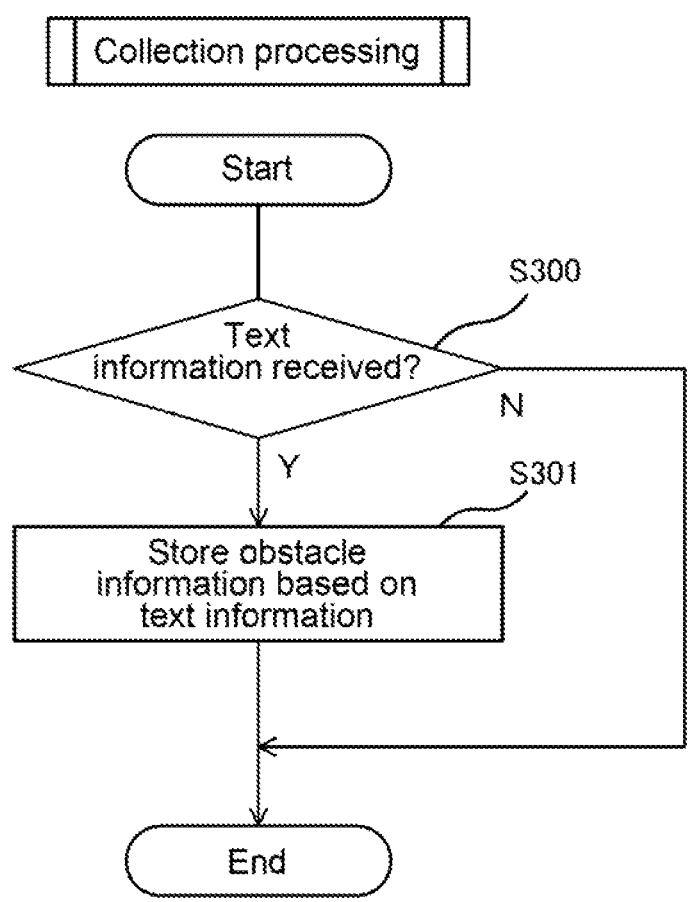
FIG. 10 is a flowchart showing the flow of collection processing executed in the center server of the embodiment.

In step S300 of FIG. 10, the CPU 30A determines whether or not text information has been received from the edge server 32. When the CPU 30A determines that the text information has been received, the processing proceeds to step S301. On the other hand, when the CPU 30A determines that the text information has not been received, the collection processing ends.

In step S301, the CPU 30A stores obstacle information based on the text information. As a result, the position of the obstacle O and the content of the obstacle O are stored in the storage 30D. Then, the collection processing ends.

On the other hand, the flow of the notification processing executed in the center server 34 after the obstacle O has been specified is as follows.

Figure 11:
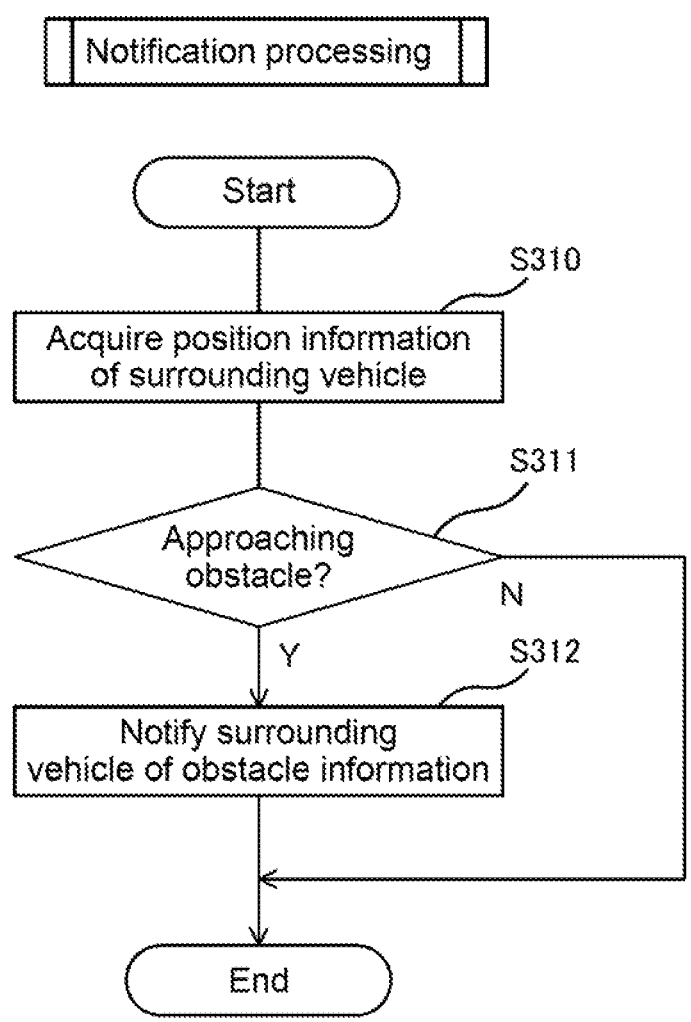
FIG. 11 is a flowchart showing the flow of notification processing executed in the center server of the embodiment.

In step S310 of FIG. 11, the CPU 30A acquires the position information of the surrounding vehicle 12B.

In step S311, CPU 30A determines whether or not peripheral vehicle 12B has approached obstacle O. For example, as shown in FIG. 12, when there is an obstacle O on the traveling path T, such as lumber, a cardboard box, or a container box, which may interfere with the traveling of the vehicle 12, a determination is made as to whether or not there is a peripheral vehicle 12B that has entered within the range of a distance R from the obstacle O. When the CPU 30A determines that the surrounding vehicle 12B has approached the obstacle O, the processing proceeds to step S312 in FIG. 11. On the other hand, when the CPU 30A determines that the surrounding vehicle 12B has not approached the obstacle O, the CPU 30A ends the notification processing.

In step S312, the CPU 30A notifies the surrounding vehicle 12B that has approached the obstacle O of the obstacle information as the danger information. The obstacle information to be notified may be the received text information itself. The notification processing is then ended. Although the center server 34 of the present embodiment transmits the obstacle information to the control device 20 of the peripheral vehicle 12B via the edge server 32, the obstacle information may be transmitted to the control device 20 directly without passing through the edge server 32.

Through the above notification processing, the peripheral vehicle 12B that has received the obstacle information alerts the driver to the obstacle O.

(Summary)

The information collection system 10 of the present embodiment is configured to collect the information of the obstacle O whose content is specified by the center server 34 based on the information transmitted from the control device 20 mounted on the vehicle 12. In the control device 20 of the present embodiment, the calculation unit 255 calculates the degree of confidence that the captured image captured by the camera 22 includes an obstacle, and the transmission unit 260 transmits the image information related to the captured image, the position information, and the confidence level, to the edge server 32. In the edge server 32, the receiving unit 350 receives the information transmitted from the transmitting unit 260, and the sorting unit 352 sorts the captured images in descending order of confidence level. Then, the image processing unit 354 performs image processing in descending order of confidence level, and attempts to identify the obstacle O included in the captured image. Further, in the edge server 32, when the obstacle O can be identified, the transmission unit 356 transmits the position information of the obstacle O and the text information related to the obstacle O to the center server 34. In the center server 34, the receiving unit 360 receives the text information transmitted from the transmitting unit 356 and stores the text information in the storage 30D.

As described above, in the present embodiment, the presence/absence of an obstacle and the nature of the obstacle are estimated at the stage of calculating the confidence level in the control device 20. Then, a captured image having a high possibility of including an obstacle is transmitted to the edge server 2, and is specified in detail in the image processing of the edge server 32. Then, the result of the identified obstacle O is transmitted from the edge server 32 to the center server 34.

In the present embodiment, the image information is transmitted from the control device 20 to the edge server 32, and the text information is transmitted from the edge server 32 to the center server 34. That is, according to the information collecting system 10 of the present embodiment, the image information is converted into text information having a smaller information amount than the image information by passage through the edge server 32. Therefore, the amount of information received by the center server 34 can be reduced, and the processing load on the center server 34 can be reduced.

Further, in the information collecting system 10 of the present embodiment, in the center server 34, the receiving unit 360 receives the text information relating to the position of the obstacle O and the position information of the peripheral vehicle 12B, and the determining unit 364 determines whether or not the peripheral vehicle 12B has approached the obstacle O. When it is determined that the surrounding vehicle 12B has approached the obstacle O, the notification unit 366 notifies the surrounding vehicle 12B of the danger information. According to the present embodiment, it is possible to call the attention of the peripheral vehicle 12B to the obstacle O on the traveling path T based on the position information of the obstacle O.

In the above-described embodiment, the captured images are rearranged based on the degree of confidence from the control device 20 of each vehicle 12. However, even if the same obstacle O is imaged, the level of the degree of confidence may not match due to differences in the resolution of the camera 22 mounted on the vehicle 12, the processing capacity of the control device 20, the reference image data 210, and the like. Therefore, the sorting unit 352 may perform the sorting after multiplying the degree of confidence by a confidence level that is a weighting set for each vehicle 12.

For example, the captured image received from the passing vehicle 12A, which is a vehicle A, is given a degree of confidence of 0.9 and a confidence level of 0.5, and the captured image received from another passing vehicle 12A, which is a vehicle B, is given a degree of confidence of 0.6 and a confidence level of 0.9. In this case, when the rearrangement unit 352 performs the rearrangement based only on the degree of confidence, the captured image of the vehicle A is prioritized over the captured image of the vehicle B. However, when the confidence level is taken into consideration, that is, when the degree of confidence and the confidence level are multiplied, the captured image of the vehicle B is prioritized over the captured image of the vehicle A. In this way, by adding the confidence level, the edge server 32 can identify the obstacle early, and it is possible to prevent the image processing from being repeatedly executed without identifying the obstacle.

It should be noted that various processors other than a CPU may execute the various processes executed by the CPUs 20A and 30A by reading the software including the program in the above embodiment. Examples of such processors include programmable logic devices (PLD) with circuit configurations that are reconfigurable after manufacture, such as field-programmable gate arrays (FPGA), and dedicated electronic circuits that are processors including circuit configurations custom designed to execute specific processing, such as application specific integrated circuits (ASIC) or the like. Moreover, the above-described reception processing may be executed by one of such processors, or may be executed by a combination of two or more processors of the same type or different types (for example, plural FPGAs, or a combination of a CPU and an FPGA). More specific examples of hardware structures of such processors include electric circuits configured by combining circuit elements, such as semiconductor devices.

In the embodiment described above, explanation has been given in which the respective programs are provided in a format pre-stored or installed on a non-transitory computer-readable recording medium. For example, in the control device 20, the control program 200 is stored in the ROM 20B in advance. Further, for example, the relay program 300 in the edge server 32 and the processing program 320 in the center server 34 are stored in advance in the storage 30D of each server 30. However, there is no limitation thereof, and the respective programs may be provided in a format stored on a non-transitory recording medium such as Compact Disc Read Only Memory (CD-ROM), Digital Versatile Disc Read Only Memory (DVD-ROM), or Universal Serial Bus (USB) memory. The programs may alternatively be provided in a format that can be downloaded from an external device through a network.

The processing flows described in the above exemplary embodiment are merely examples thereof, and unnecessary steps may be omitted, new steps added, or the processing sequence changed within a range not departing from the spirit thereof.

What is claimed is:

1. An information collection system, comprising:
a control device installed at a vehicle;
a collection device configured to collect obstacle information from a plurality of the control devices; and
a relay device configured to relay communications between the control device and the collection device, wherein:
the control device includes a first processor configured to:
calculate a degree of confidence that an obstacle is included in a captured image captured by an image capture device provided at the vehicle, and
transmit, to the relay device, image information relating to the captured image, travelling direction, position information added to the captured image, and the degree of confidence,
the relay device includes a second processor configured to:
receive the image information, the position information, the travelling direction, and the degree of confidence, at two or more different times from the plurality of the control devices,
sort the image information, received from the plurality of the control devices at the two or more different times, for each image capture location and the travelling direction based, on the degree of confidence, subsequent to sorting the image information, identify what an obstacle included in the captured image is, according to the sorted image information in descending order of the degree of confidence for each image capture location and the travelling direction, and in a case in which an obstacle has been identified, transmit, to the collection device, text information relating to a position of the identified obstacle and a content of the identified obstacle, and the collection device includes a third processor configured to:

receive the text information from one or a plurality of the relay devices, and store the text information corresponding to the identified obstacle.

2. The information collection system of claim 1, wherein the third processor is further configured to:

receive other position information of another vehicle, determine whether or not the other vehicle having the other position information has approached the identified obstacle corresponding to the position information, and notify the other vehicle of danger information based on the text information in a case in which it is determined that the other vehicle has approached the identified obstacle.

3. The information collection system of claim 1, wherein a weighting set for each of the vehicles has been attached to the degree of confidence.

4. The information collection system of claim 1, wherein the second processor is further configured to terminate reception of the image information from the control device in a case in which an obstacle has been identified.

5. A relay device, comprising a processor configured to:

receive image information of a captured image captured by an image capture device provided at a vehicle, travelling direction, position information attached to the captured image, and a degree of confidence that an obstacle is included in the captured image, from a control device installed at each of a plurality of the vehicles, the image information being received at two or more different times;

sort the image information, received from the control device installed at each of the plurality of the vehicles at the two or more different times, for each image capture location and the travelling direction based on the degree of confidence;

subsequent to sorting the image information, perform image processing to identify what an obstacle included in the captured image is according to the sorted image information in descending order of the degree of confidence for each image capture location and the travelling direction; and in a case in which an obstacle has been identified, transmit, to a collection device configured to collect obstacle information, text information relating to a position of the identified obstacle and a content of the identified obstacle.

6. A non-transitory recording medium storing a program that is executable by a computer to function as the processor of the relay device of claim 5.

* * * * *